Patented Aug. 3, 1943

2,325,753

UNITED STATES PATENT OFFICE 2,325,753

METHOD OF MAKING DINITRO CRESOL

Maurice L. Dolt, Plainfield, and Alfred G. Hill, North Branch, N. J., assignors to American Cyanamid Company, New York, N. Y., a corporation of Maine No Drawing. Application January 2, 1941, Serial No. 372,834

3 Claims. (Cl. 260—622)

The present invention relates to methods for the preparation of the dinitro cresols.

A known method of nitrating cresols involves nitration at a very low temperature requiring extensive refrigeration, the reaction being carried out for a period of at least ten hours. This method is unsatisfactory due to the cost of maintaining the reaction mixture at the low temperature specified while the lengthy reaction period results in an extremely long time cycle.

The principal object of the present invention is to improve the above method by inducing a smooth, easily controllable reaction, which eliminates costly refrigeration while at the same time materially cutting down on the nitration period and, consequently, the time cycle.

The present invention is based on the observation that by adding the sulfonation mixture to the nitration mixture rather than the reverse, no sudden and uncontrollable rise of temperature is experienced, thus avoiding decomposition with resultant evolution of excess amounts of oxides of nitrogen. Moreover, it has been discovered that the time of nitration can be considerably decreased by allowing the temperature of the mix to rise to from 30 to 40° C. over a period of about 30 minutes followed by heating of from ½ to 2 hours to approximately 80 to 100° C. provided that the resultant mixture is cooled to 80 to 85° C. The above procedure has been found to result in a considerable saving of time in the nitration period while producing a dinitro cresol of exceptional purity.

Example I 39.5 grams of 93% sulfuric acid was added during five minutes to 27 grams of pure ortho cresol. The temperature rose from 25° C. to about 65° C. The mixture was heated at from 75 to 80° C. for 15 minutes. A 23% solution of nitric acid was prepared by adding 68 grams of 69% acid to 136 grams of water. It has been found more advantageous to dilute the nitric acid solution to the proper concentration rather than to dilute the sulfonation mixture with water. This dilute acid was then cooled to from 25 to 30° C. and the sulfonation mixture added at that temperature with stirring for a period of 30 minutes. At this point, a light precipitate was formed. The solution was heated to the boil in about 2 hours at a constant rate. The first precipitate melted or dissolved at 40° C. and a new one began to appear at about 50° C. Evidences of an exothermic reaction were noted at 60°. The second precipitate melted at 80°. As soon as 100° C. was reached, the mixture was allowed to cool to 80 to 85° C. and then run into 920 cc. of cold water. The precipitated material was filtered, washed and dried. The dinitro ortho cresol thus prepared had a light yellow color and a melting point of 86 to 87° C.

Example II

The same procedure as set forth above was followed using, however, a para cresol as the starting material. The dinitro para cresol thus produced had a melting point of from 79 to 81° C.

While the invention has been described with particular reference to specific embodiments, it is to be understood that it is not to be limited thereto but is to be construed broadly and restricted solely by the scope of the appended claims.

We claim:

1. A method of preparing a compound selected from the group consisting of dinitro-o-cresol and dinitro-p-cresol, which includes the following steps, forming a cresol sulfonation mixture from concentrated sulfuric acid and a compound selected from the group consisting of ortho cresol and para cresol, adding the sulfonation mixture to dilute nitric acid at room temperature with agitation while allowing the temperature to rise to substantially 40° C., thereafter heating the mixture to from 80° C. to 100° C., and subsequently isolating the dinitro cresol.

2. A method of preparing dinitro-o-cresol which includes forming a cresol sulfonation mixture from concentrated sulfuric acid and ortho cresol, adding the sulfonation mixture to dilute nitric acid at room temperature with agitation while allowing the temperature to rise to substantially 40° C., thereafter heating the mixture to from 80° C. to 100° C., and subsequently isolating the dinitro-o-cresol.

3. A method of preparing dinitro-p-cresol which includes forming a cresol sulfonation mixture from concentrated sulfuric acid and para cresol, adding the sulfonation mixture to dilute nitric acid at room temperature with agitation while allowing the temperature to rise to substantially 40° C., thereafter heating the mixture to from 80° C. to 100° C., and subsequently isolating the dinitro-p-cresol.

MAURICE L. DOLT.
ALFRED G. HILL.